No. 769,751. PATENTED SEPT. 13, 1904.
P. LA COURT.
MOTOR FOR PORTABLE TOOLS.
APPLICATION FILED OCT. 23, 1901.
NO MODEL.

Witnesses:
C. B. Maynadier
Arthur D. Randall

Inventor:
Peter La Court,
by G. A. Rockwell,
Attorney

No. 769,751.  
Patented September 13, 1904.

UNITED STATES PATENT OFFICE.

PETER LA COURT, OF CLINTON, MASSACHUSETTS.

MOTOR FOR PORTABLE TOOLS.

SPECIFICATION forming part of Letters Patent No. 769,751, dated September 13, 1904.

Application filed October 23, 1901. Serial No. 79,678. (No model.)

*To all whom it may concern:*

Be it known that I, PETER LA COURT, of Clinton, in the county of Worcester and State of Massachusetts, have invented an Improved Motor for Portable Tools, of which the following is a specification, reference being had to the accompanying drawings, in which—

Figure 1:
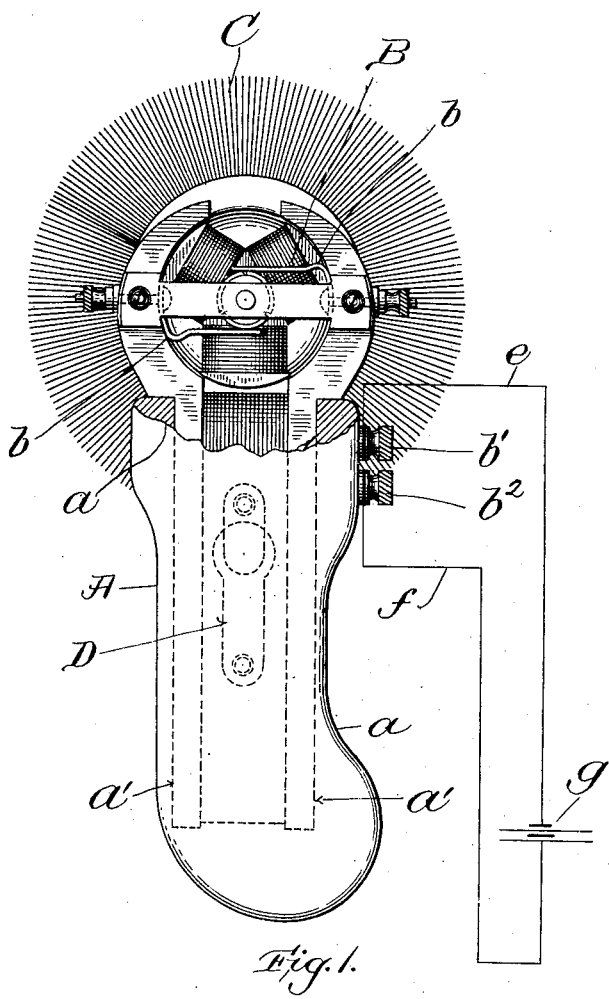
Figure 2:
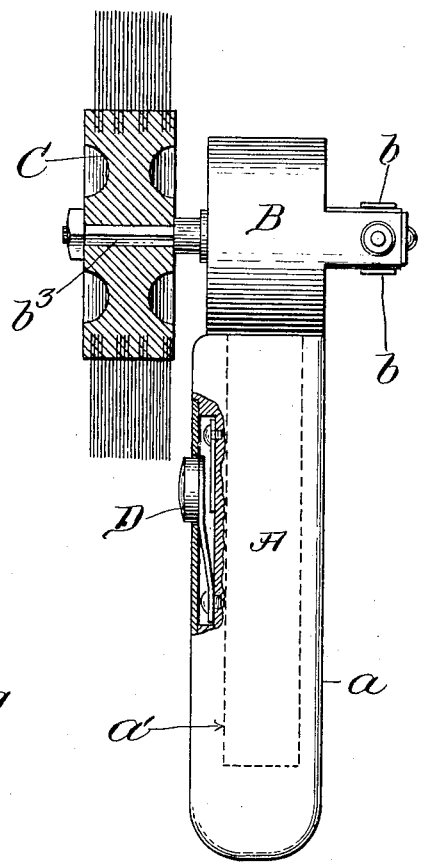

Figure 1 is an elevation, partly in section, of a polishing device embodying my invention; and Fig. 2 is a side elevation, partly in section, of the polishing device shown in Fig. 1.

The object of my invention is to provide a motor for portable tools, the magnet of which is extended and enlarged to form a handle for the portable tool, and to use the handle for increasing the power of the magnet, and consequently the efficiency of the brush, without increasing the size of the tool itself; and my invention is a motor for portable tools wherein the armature is upon the outside of a handle and at one end thereof and has its shaft crosswise of the handle, the pole-pieces of the motor being extended within the handle to increase the power of the instrument.

Having reference to the drawings, in Figs. 1 and 2, which illustrate the best form of my invention, the handle portion A comprises an outer part $a$, of wood or other non-conducting material, which is made hollow to receive within it the extensions $a'$ $a'$ of the pole-pieces of an electric motor B and the winding of the field of motor B, whereby I am enabled to use a comparatively large and powerful motor, a portion of which serves as the handle of the polishing device; but preferably this portion of the motor is covered by the wooden non-conducting part $a$.

The commutator-brushes $b$ of motor B are connected in the ordinary manner with two binding-posts $b'$ $b^2$, which are fixed to handle portion A. These binding-posts serve as means for operatively connecting motor B with a source of electrical energy. Herein said posts are shown as connected with wires $e$ and $f$, which connect the parts with a battery $g$. Fast on one end of the armature-shaft $b^3$ is a rotary tool $c$, herein shown as a polishing-brush. On handle A is a switch D, which is in the circuit of motor B, and switch D is so arranged and constructed as to be held closed by the hand of the operator when the brush is in use.

The chief advantage of my invention is that it provides a comparatively large magnetic field in a comparatively small and well-balanced portable tool.

While I have shown and described my invention as applied to a polishing-brush, any other suitable form of tool may be used in lieu of brush D, and the device, of course, is useful for other purposes than that of polishing.

What I claim as my invention is—

An electric motor for portable tools having its armature rotatably mounted at one end of a handle with its shaft crosswise thereof, and the pole-pieces of the motor extended perpendicularly to that shaft into said handle, and said handle fastened to and inclosing the extensions of the pole-pieces, substantially as described.

PETER LA COURT.

Witnesses:
C. B. MAYNADIER,
G. A. ROCKWELL.